United States Patent [19]

Go et al.

[11] Patent Number: 5,593,805
[45] Date of Patent: Jan. 14, 1997

[54] OXYTITANIUM PHTHALOCYANINE, PROCESS FOR PRODUCING SAME AND ELECTROPHOTOGRAPHIC PHOTOSENSITIVE MEMBER USING SAME

[75] Inventors: Shintetsu Go; Hideyuki Takai; Hajime Miyazaki, all of Yokohama; Itaru Yamazaki, Kawasaki; Tetsuro Kanemaru, Tokyo; Kazushi Iuchi, Ebetsu, all of Japan

[73] Assignee: Canon Kabushiki Kaisha, Tokyo, Japan

[21] Appl. No.: 873,024

[22] Filed: Apr. 24, 1992

[30] Foreign Application Priority Data

Apr. 24, 1991 [JP] Japan ................. 3-094370

[51] Int. Cl.$^6$ ................. G03G 15/06; C07D 487/22
[52] U.S. Cl. ................. 430/78; 430/58; 540/141; 399/159
[58] Field of Search ................. 430/78, 58, 66; 540/141; 355/271, 296

[56] References Cited

U.S. PATENT DOCUMENTS

| | | | |
|---|---|---|---|
| 4,444,861 | 4/1984 | Nogami et al. | 430/58 |
| 4,728,592 | 3/1988 | Ohaku et al. | 430/59 |
| 4,898,799 | 2/1990 | Fujimaki et al. | 430/59 |
| 4,994,566 | 2/1991 | Mimura et al. | 540/141 |
| 5,008,173 | 4/1991 | Mimura et al. | 430/78 |
| 5,132,197 | 7/1992 | Iuchi et al. | 430/78 |

FOREIGN PATENT DOCUMENTS

| | | |
|---|---|---|
| 337476 | 10/1989 | European Pat. Off. . |
| 409737 | 1/1991 | European Pat. Off. . |
| 3823363 | 1/1989 | Germany . |
| 59-166959 | 9/1959 | Japan . |
| 63-0366 | 1/1988 | Japan . |
| 63-116158 | 5/1988 | Japan . |
| 63-198067 | 8/1988 | Japan . |
| 64-17066 | 1/1989 | Japan . |

*Primary Examiner*—John Goodrow
*Attorney, Agent, or Firm*—Fitzpatrick, Cella, Harper & Scinto

[57] ABSTRACT

A new crystalline form of oxytitanium phthalocyanine is characterized by main peaks specified by Bragg angles ($2\theta \pm 0.2$ degrees) of 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays. The oxytitanium phthalocyanine is formed by treating amorphous oxytitanium phthalocyanine with a solvent selected from the group consisting of monohydric alcohols having at least two carbon atoms, cellosolves, diethylene glycol monoethers and diacetone alcohol. The oxytitanium phthalocyanine is useful as a charge generating material for providing an electrophotographic photosensitive member, which shows a stably high sensitivity to long wavelength light.

21 Claims, 11 Drawing Sheets

OXYTITANIUM PHTHALOCYANINE, PROCESS FOR PRODUCING SAME AND ELECTROPHOTOGRAPHIC PHOTOSENSITIVE MEMBER USING SAME

FIELD OF THE INVENTION AND RELATED ART

The present invention relates to oxytitanium phthalocyanine having a novel crystal form, a process for producing the oxytitanium phthalocyanine and an electrophotographic photosensitive member having a photosensitive layer containing the oxytitanium phthalocyanine.

The present invention also relates to an electrophotographic apparatus, an apparatus unit and a facsimile apparatus respectively using the electrophotographic photosensitive member.

Recently, non-impact type printers utilizing electrophotography have been frequently used as terminal printers instead of the conventional impact type printers. These printers are laser beam printers using lasers as light sources in general. As the light sources, semiconductor lasers are mainly used in view of cost, apparatus size, etc. The semiconductor lasers have long wavelengths (i.e., emission wavelengths: around 790±20 nm), so that electrophotographic photosensitive members having sufficient sensitivity for laser light having the long wavelengths have been developed. The sensitive wavelength region of an electrophotographic photosensitive member varies depending on the kind of a charge-generating material used therein.

There have been studied many charge-generating materials having sensitivity for long-wavelength light, which include metallic phthalocyanine compounds, such as chloroaluminum phthalocyanine, chloro-indium phthalocyanine, oxyvanadium phthalocyanine, chloro-gallium phthalocyanine, magnesium phthalocyanine and oxytitanium phthalocyanine; and non-metallic phthalocyanine compounds.

For many phthalocyanine compounds among these, various crystal forms have been known. It is generally known, for example, that non-metallic phthalocyanine compounds of $\alpha$-type, $\beta$-type, $\gamma$-type, $\delta$-type, $\epsilon$-type, $\chi$-type, $\tau$-type, etc., and copper phthalocyanine of $\alpha$-type, $\beta$-type, $\gamma$-type, $\delta$-type, $\epsilon$-type, $\chi$-type, etc., exist. Further, it is also generally known that the difference in crystal form exerts great influence on electrophotographic characteristics (i.e., sensitivity, potential stability in durability test, etc.) and paint characteristics when the phthalocyanine compounds are used in paint.

Many different crystal forms of oxytitanium phthalocyanine having high sensitivity for the long-wavelength light in particular have been known similarly as in the case of the above non-metallic phthalocyanine compounds and copper phthalocyanine, including those disclosed in U.S. Pat. No. 4,444,861, Japanese Laid-Open Patent Application (JP-A) 59-166959, U.S. Pat. No. 4,728,592, JP-A 63-366, JP-A 63-116158, JP-A 63,198067 and JP-A 64-17066.

SUMMARY OF THE INVENTION

An object of the present invention is to provide an oxytitanium phthalocyanine having a novel crystal form and a process for producing the oxytitanium phthalocyanine.

Another object of the present invention is to provide a crystal form of oxytitanium phthalocyanine which is excellent in solvent stability and a process for producing the oxytitanium phthalocyanine crystal.

Another object of the present invention is to provide an electrophotographic photosensitive member having high photosensitivity for long-wavelength light.

A further object of the present invention is to provide an electrophotographic photosensitive member which has excellent stability of electric potential and can stably provide good images during repetitive use.

A still further object of the present invention is to provide an electrophotographic photosensitive member accompanied with little photomemory characteristic after irradiation with visible rays for a long time.

A still further object of the present invention is to provide an electrophotographic apparatus, an apparatus unit and a facsimile apparatus, respectively including the electrophotographic photosensitive member.

According to the present invention, there is provided oxytitanium phthalocyanine having a novel crystal form characterized by main peaks specified by Bragg angles ($2\theta\pm0.2$ degree) of 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuK$\alpha$ characteristic X-rays.

According to the present invention, there is also provided a process for producing such an oxytitanium phthalocyanine as described above, which comprises treating amorphous oxytitanium phthalocyanine with a solvent selected from the group consisting of monohydric alcohols having at least two carbon atoms, cellosolves, diethylene glycol monoethers, and diacetone alcohol.

The present invention also provides an electrophotographic photosensitive member, comprising an electroconductive support and a photosensitive layer thereon, the photosensitive layer containing such an oxytitanium phthalocyanine as described above.

The present invention further provides an electrophotographic apparatus, an apparatus unit and a facsimile apparatus including the above-mentioned electrophotographic photosensitive member.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
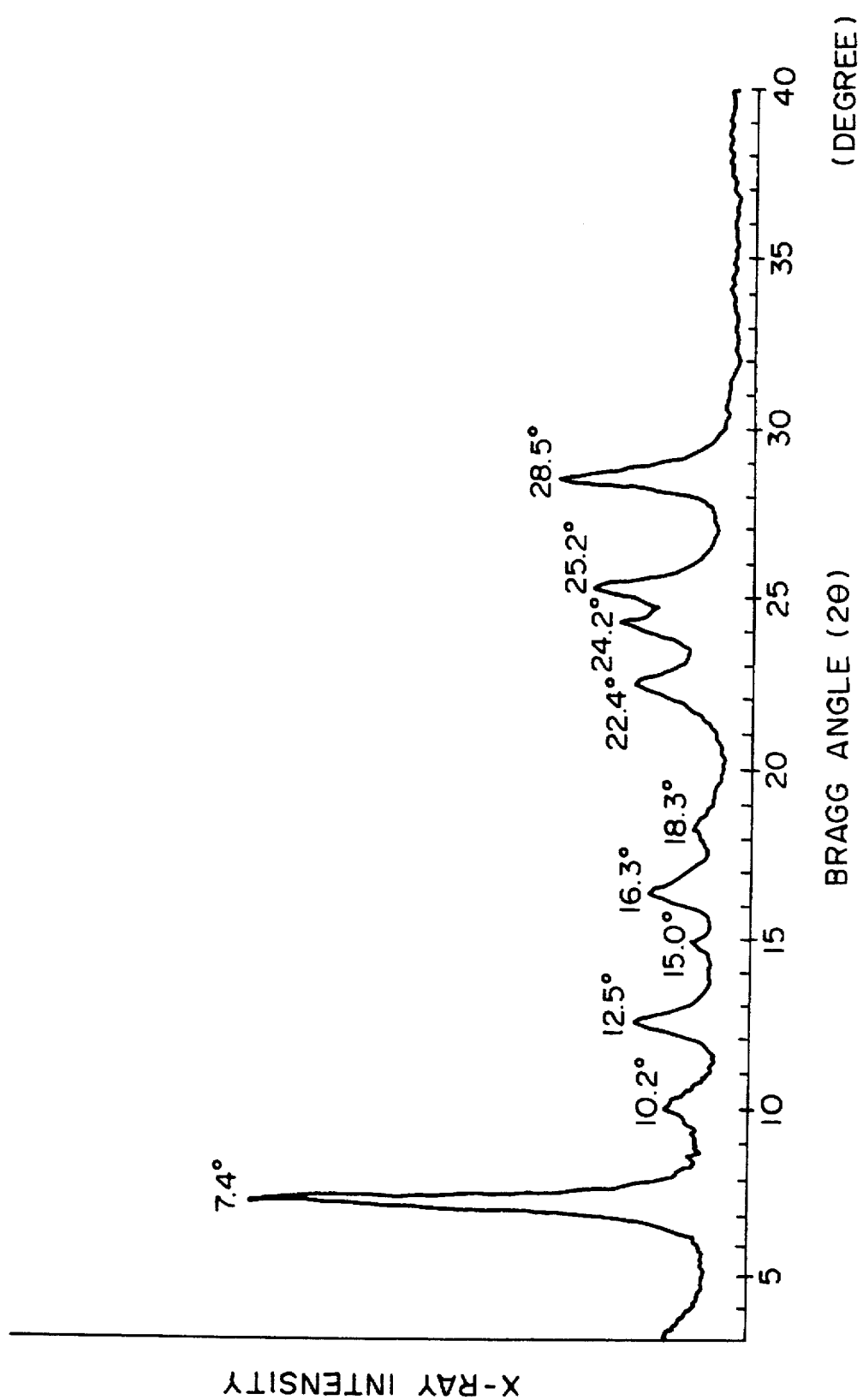
FIGS. 1, 6 and 7 show CuK$\alpha$ X-ray diffraction patterns of oxytitanium phthalocyanines according to the present invention obtained in Production Examples 1, 2 and 3, respectively.

The oxytitanium phthalocyanine according to the present invention is characterized by providing a CuKα X-ray diffraction pattern, as shown in FIG. 1, giving strong peaks at Bragg angles (2θ±0.2 degree) of 7.4 degrees, 10.2 degrees, 12.5 degrees, 15.0 degrees, 16.3 degrees, 18.3 degrees, 22.4 degrees, 24.2 degrees, 25.2 degrees and 28.2 degrees. The above peaks may be selected in order of peak intensity by taking the highest ten peaks.

The shapes of the peaks in the X-ray diffraction pattern of the oxytitanium phthalocyanine according to the invention can be slightly changed depending on the production or measuring conditions. For example, the tip of each peak can split in some cases.

The structural formula of oxytitanium phthalocyanine according to the present invention is represented by the following formula:

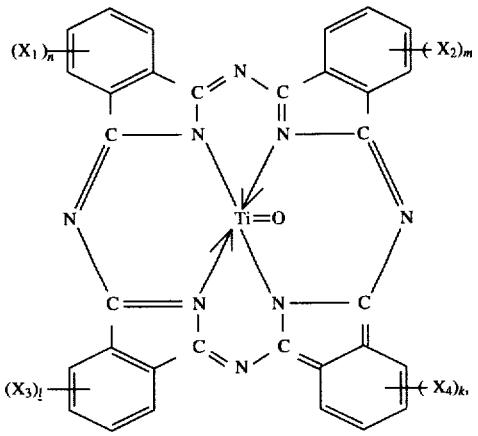

wherein $X_1$, $X_2$, $X_3$ and $X_4$ respectively denote Cl or Br; and n, m, l and k are respectively an integer of 0–4.

A representative example of the process for producing the oxytitanium phthalocyanine having a specific crystal form of the invention is described below.

Titanium tetrachloride is reacted with o-phthalodinitrile in α-chloronaphthalene to provide dichlorotitanium phthalocyanine. The resultant dichlorotitanium phthalocyanine is washed with a solvent such as α-chloronaphthalene, trichlorobenzene, dichlorobenzene, N-methylpyrrolidone or N,N-dimethylformamide and is further washed with a solvent such as methanol or ethanol, followed by hydrolysis with hot water to obtain an oxytitanium phthalocyanine crystal. The resultant crystal may comprise a mixture of various crystal forms in most cases. According to the present invention, the resultant crystal is treated by acid pasting (i.e., a method of dissolving the mixture in acid (e.g., sulfuric acid) and pouring the resultant solution into water to reprecipitate a solid in the form of a paste), whereby the resultant crystal is converted into amorphous oxytitanium phthalocyanine.

The resultant amorphous oxytitanium phthalocyanine is then treated in a dispersing medium comprising an organic solvent selected from monohydric alcohols having at least two carbon atoms, such as ethanol, isopropyl alcohol, n-propyl alcohol, n-butyl alcohol, t-amyl alcohol and n-octyl alcohol; cellosolves, such as methyl cellosolve, ethyl cellosolve, n-butyl cellosolve, ethylene glycol mono-t-butyl ether and 1-methoxy-2-propyl alcohol; diethylene glycol monoethers, such as methyl carbitol, ethyl carbitol and diethylene glycol mono-n-butyl ether; and diacetone alcohol.

For the solvent treatment, the amorphous oxytitanium phthalocyanine may be stirred in suspension in such a solvent or dispersed or milled in the presence of such a solvent, e.g., by a milling device using glass beads, steel beads, or alumina balls, at room temperature, under heating or under boiling, to obtain crystalline oxytitanium phthalocyanine according to the present invention.

The resultant oxytitanium phthalocyanine of the invention functions as an excellent photoconductor and may be adapted for an electronic material such as an electrophotographic member, a solar cell, a sensor or a switching device.

Hereinafter, some examples of application of the oxytitanium phthalocyanine crystal of the invention to a charge-generating material in an electrophotographic photosensitive member will be explained.

Figure 2:
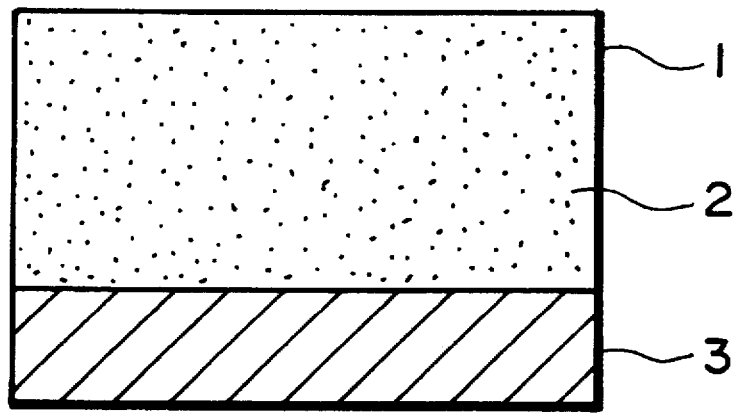
FIGS. 2 and 3 are schematic sectional views each showing a laminar structure of an electrophotographic photosensitive member according to the present invention.
Figure 3:
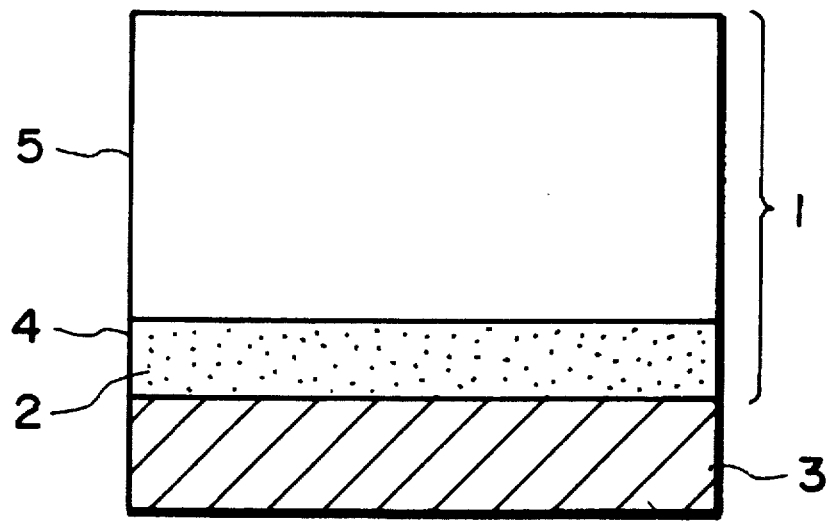

Representative embodiments of laminar structure of the electrophotographic photosensitive member of the invention are shown in FIGS. 2 and 3.

FIG. 2 shows an embodiment, wherein a photosensitive layer 1 is composed of a single layer and comprises a charge-generating material 2 and a charge-transporting material (not shown) together. The photosensitive layer 1 may be disposed on an electroconductive support 3.

FIG. 3 shows an embodiment of laminated structure wherein a photosensitive layer 1 comprises a charge generation layer 4 comprising a charge-generating material 2, i.e., oxytitanium phthalocyanine according to the present invention, and a charge transport layer 5 comprising a charge-transporting material (not shown) disposed on the charge generation layer 4; and the charge transport layer 5 may be disposed on an electroconductive support 3. The charge generation layer 4 and the charge transport layer 5 can be disposed in reverse.

In production of the electrophotographic photosensitive member, the electroconductive support 3 may be a material having an electroconductivity including: a metal or alloy, such as aluminum or stainless steel; and metal, alloy, plastic or paper having an electroconductive layer. The support 3 may be in the form of, e.g., a cylinder or drum, a film or a belt, and may assume a shape adapted to an electrophotographic apparatus to be used therewith.

Between the electroconductive support 3 and the photosensitive layer 1, there can be formed a primer or undercoat layer having a barrier function and an adhesive function as an intermediate layer. The primer layer may comprise a substance, such as polyvinyl alcohol, polyethylene oxide, ethyl cellulose, methyl cellulose, casein, polyamide, glue or gelatin. The above substance may be dissolved in an appropriate solvent and applied onto the electroconductive support 3 to prepare the primer layer. The thickness of the primer layer may preferably be 0.2–3.0 microns.

The photosensitive layer which is composed of a single layer as shown in FIG. 2 may be formed by mixing the charge-generating material comprising the oxytitanium phthalocyanine crystal of the invention and a charge-transporting material with an appropriate solution containing a binder resin, applying the resultant coating liquid and then drying the coating.

The charge generation layer 3 of the photosensitive layer 1 having a laminated structure as shown in FIG. 3 may be formed by dispersing the charge-generating material comprising the oxytitanium phthalocyanine crystal of the invention in an appropriate solution containing a binder resin, applying the resultant coating liquid and then drying the coating. It is possible not to use the binder resin in the above solution. The charge generation layer may also be formed by vapor deposition of the oxytitanium phthalocyanine according to the present invention. The oxytitanium phthalocyanine can also be used in combination with another charge generation material.

Examples of the binder resin for the charge generation layer may include: polyester, acrylic resins, polyvinylcarbazole, phenoxy resins, polycarbonate, polyvinyl butyral, polystyrene, vinyl acetate resins, polysulfone, polyarylate or vinylidene chloride-acrylonitrile copolymers.

The charge transport layer may be formed by dissolving a charge-transporting material and a binder resin in an appropriate solvent, applying the resultant coating liquid and then drying the coating. Examples of the charge-transporting material used may include: triaryl amine compounds, hydrazone compounds, stilbene compounds, pyrazoline compounds, oxazole compounds, thiazole compounds or triaryl methane compounds. As the binder resin, the above-mentioned resins can be used.

The method for applying the photosensitive layer(s) may be: dipping, spray coating, spinner coating, bead coating, blade coating or beam coating.

In formulating the photosensitive layer, when the photosensitive layer is composed of a single layer, the charge-generating material and the charge-transporting material may preferably be contained in the photosensitive layer in amounts of 2–20 wt. % and 30–80 wt. %, respectively, particularly 2–10 wt. % and 40–70 wt. %, respectively. When the photosensitive layer has a laminated structure, the charge-generating material may preferably be contained in the charge generation layer in an amount of 20–80 wt. %, particularly 50–70 wt. %, and the charge-transporting material may preferably be contained in the charge transport layer in an amount of 30–70 wt. %, particularly 40–60 wt. %.

The thickness of the photosensitive layer which is composed of a single layer may preferably be 5–40 microns, more preferably 10–30 microns. When the photosensitive layer has a laminated structure, the thickness of the charge generation layer may preferably be 0.01–10 microns, more preferably 0.05–5 microns, and the thickness of the charge transport layer may preferably be 5–40 microns, more preferably 10–30 microns.

In order to protect the photosensitive layer from external shock, a thin protective layer can be further disposed on the photosensitive layer.

When the oxytitanium phthalocyanine crystal of the invention is used as the charge-generating material, it is possible to mix the oxytitanium phthalocyanine crystal with another charge-generating material or the charge-transporting material as desired.

The electrophotographic photosensitive member according to the present invention can be applied to not only a laser beam printer, a light-emitting diode (LED) printer and a cathode-ray tube (CRT) printer, but also an ordinary electrophotographic copying machine and other fields of applied electrophotography.

Figure 13:
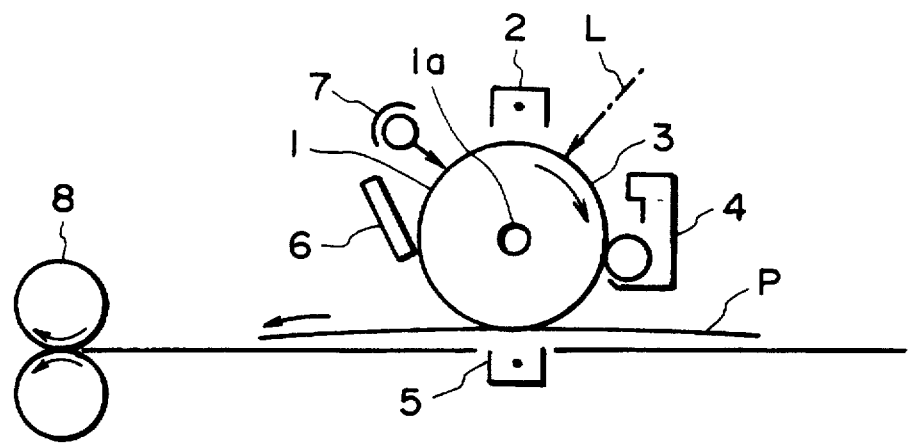
FIG. 13 is a schematic structural view of an electrophotographic apparatus using an electrophotographic photosensitive member of the invention.

FIG. 13 shows a schematic structural view of an ordinary transfer-type electrophotographic apparatus using an electrophotographic photosensitive member of the invention. Referring to FIG. 13, a photosensitive drum (i.e., photosensitive member) 1 as an image-carrying member is rotated about an axis 1a at a prescribed peripheral speed in the direction of the arrow shown inside of the photosensitive drum 1. The surface of the photosensitive drum is uniformly charged by means of a charger 2 to have a prescribed positive or negative potential. The photosensitive drum 1 is exposed to light-image L (as by slit exposure or laser beam-scanning exposure) by using an image exposure means (not shown), whereby an electrostatic latent image corresponding to an exposure image is successively formed on the surface of the photosensitive drum 1. The electrostatic latent image is developed by a developing means 4 to form a toner image. The toner image is successively transferred to a transfer material P which is supplied from a supply part (not shown) to a position between the photosensitive drum 1 and a transfer charger 5 in synchronism with the rotating speed of the photosensitive drum 1, by means of the transfer charger 5. The transfer material P with the toner image thereon is separated from the photosensitive drum 1 to be conveyed to a fixing device 8, followed by image fixing to print out the transfer material P as a copy outside the electrophotographic apparatus. Residual toner particles on the surface of the photosensitive drum 1 after the transfer are removed by means of a cleaner 6 to provide a cleaned surface, and residual charge on the surface of the photosensitive drum 1 is erased by a pre-exposure means 7 to prepare for the next cycle. As the charger 2 for charging the photosensitive drum 1 uniformly, a corona charger is widely used in general. As the transfer charger 5, such a corona charger is also widely used in general.

According to the present invention, in the electrophotographic apparatus, it is possible to provide a device unit which includes plural means inclusive of or selected from the photosensitive member (photosensitive drum), the charger, the developing means, the cleaner, etc. so as to be attached or removed as desired. The device unit may, for example, be composed of the photosensitive member and at least one sub-assembly selected from the charger, the developing means and the cleaner to prepare a single unit capable of being attached to or removed from the body of the electrophotographic apparatus by using a guiding means such as a rail in-the body. The device unit can be combined with the charger and/or the developing means to prepare a single unit.

In case where the electrophotographic apparatus is used as a copying machine or a printer, exposure light-image L may be given by reading a data on reflection light or transmitted light from an original or on the original, converting the data into a signal and then effecting a laser beam scanning, a drive of LED array or a drive of a liquid crystal shutter array so as to expose the photosensitive member with the light-image L.

Figure 14:
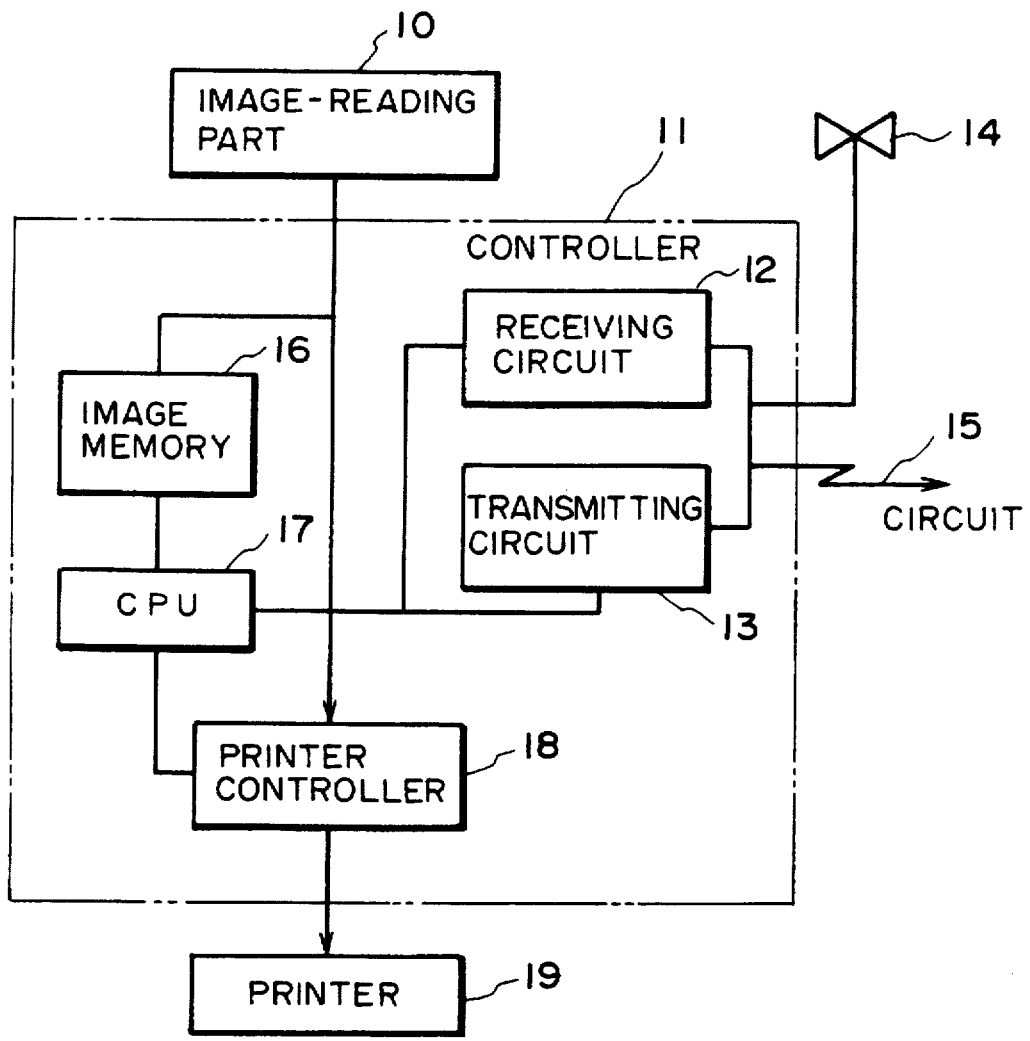
FIG. 14 is a block diagram of a facsimile apparatus using an electrophotographic apparatus of the invention as a printer.

In case where the electrophotographic apparatus according to the present invention is used as a printer of a facsimile machine, exposure light-image L is given by exposure for printing received data. FIG. 14 shows a block diagram of an embodiment for explaining this case. Referring to FIG. 14, a controller 11 controls an image-reading part 10 and a printer 19. The whole controller 11 is controlled by a CPU (central processing unit) 17. Read data from the image-reading part is transmitted to a partner station through a transmitting circuit 13, and on the other hand, the received data from the partner station is sent to the printer 19 through a receiving circuit 12. An image memory memorizes prescribed image data. A printer controller 18 controls the printer 19, and a reference numeral 14 denotes a telephone handset.

The image received through a circuit 15 (the image data sent through the circuit from a connected remote terminal) is demodulated by means of the receiving circuit 12 and successively stored in an image memory 16 after a restoring-signal processing of the image data. When image for at least one page is stored in the image memory 16, image recording of the page is effected. The CPU 17 reads out the image data for one page from the image memory 16 and sends the image data for one page subjected to the restoring-signal processing to the printer controller 18. The printer controller 18 receives the image data for one page from the CPU 17 and controls the printer 19 in order to effect image-data recording. Further, the CPU 17 is caused to receive an image for a subsequent page during the recording by the printer 19.

Hereinbelow, the present invention will be described based on Production Examples and Examples more specifically.

PRODUCTION EXAMPLE 1

Into 100 g of α-chloronaphthalene, 5.0 g of o-phthalodinitrile and 2.0 g of titanium tetrachloride were added, and the mixture was stirred for 3 hours under heating at 200° C., followed by cooling to 50° C. for precipitation of a crystal and filtration to recover a paste of dichlorotitanium phthalocyanine. The paste was then washed with 100 ml of N,N'-dimethylformamide at 100° C. under stirring, followed by two times of washing with 100 ml of methanol at 60° C. and filtration to recover a paste. The paste was then added to 100 ml of deionized water and stirred for one hour at 80° C., followed by filtration to recover 4.2 g of a blue oxytitanium phthalocyanine crystal, which showed the following results of elementary analysis.

| Elementary analysis ($C_{32}H_{16}N_8OTi$) | | | | |
|---|---|---|---|---|
| | C (%) | H (%) | N (%) | Cl (%) |
| Calculated value | 66.68 | 2.80 | 19.44 | 0.00 |
| Observed value | 66.54 | 2.70 | 19.18 | 0.30 |

Figure 4:
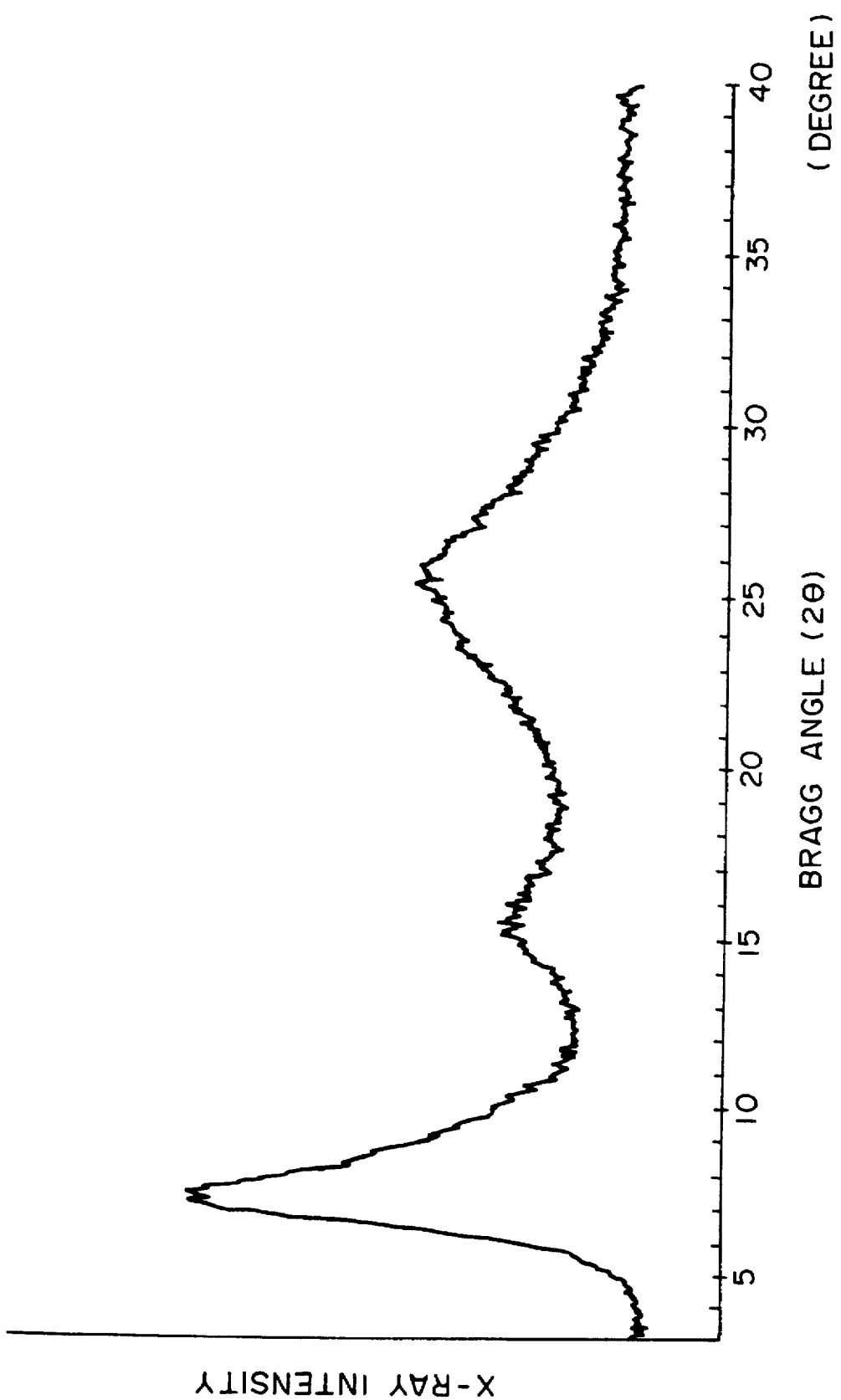
FIG. 4 shows a CuK$\alpha$ X-ray diffraction pattern of amorphous oxytitanium phthalocyanine used in Production Example 1.

The above oxytitanium phthalocyanine crystal was dissolved in 150 g of concentrated sulfuric acid and then added dropwise to 1200 ml of deionized water at 20° C. under stirring to cause re-precipitation, followed by filtration, sufficient washing with water and drying under a reduced pressure to obtain amorphous oxytitanium phthalocyanine, which provided an X-ray diffraction pattern as shown in FIG. 4.

Then, 2.0 g of the above amorphous oxytitanium phthalocyanine was added to 40 ml of ethanol and subjected to 15 hours of milling at room temperature (20° C.) together with 1 mm-dia. glass beads.

Figure 5:
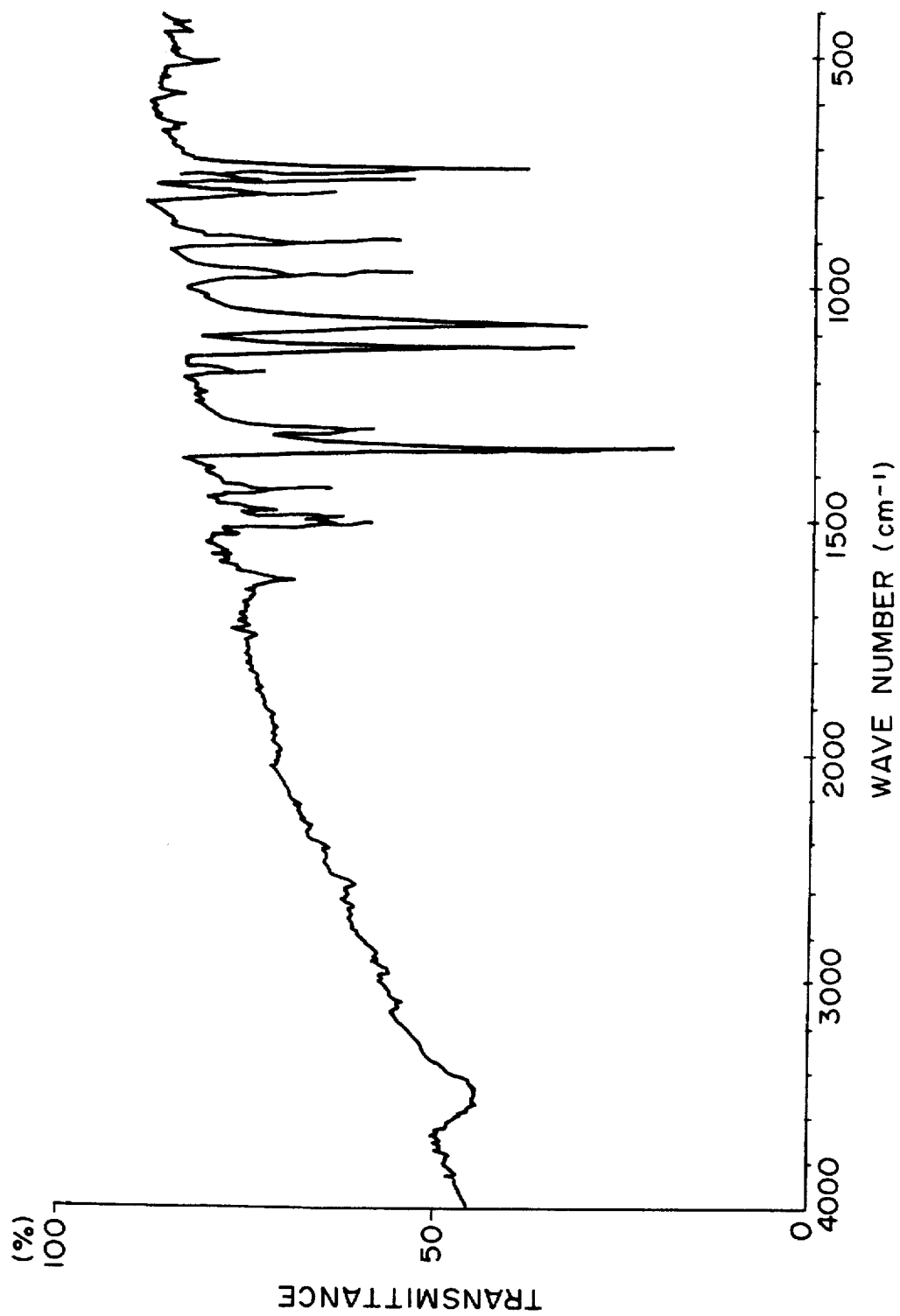
FIG. 5 shows an infrared absorption spectrum (KBr method) of the oxytitanium phthalocyanine according to the present invention prepared in Production Example 1.

The solid portion was taken out from the resultant dispersion and washed with water and then with sufficient water, followed by drying to recover 1.8 g of a new crystalline form of oxytitanium phthalocyanine according to the present invention. The oxytitanium phthalocyanine provided an X-ray diffraction pattern shown in FIG. 1, and an infrared absorption spectrum shown in FIG. 5 when measured in the form of a pellet in mixture with KBr.

PRODUCTION EXAMPLE 2

Figure 6:
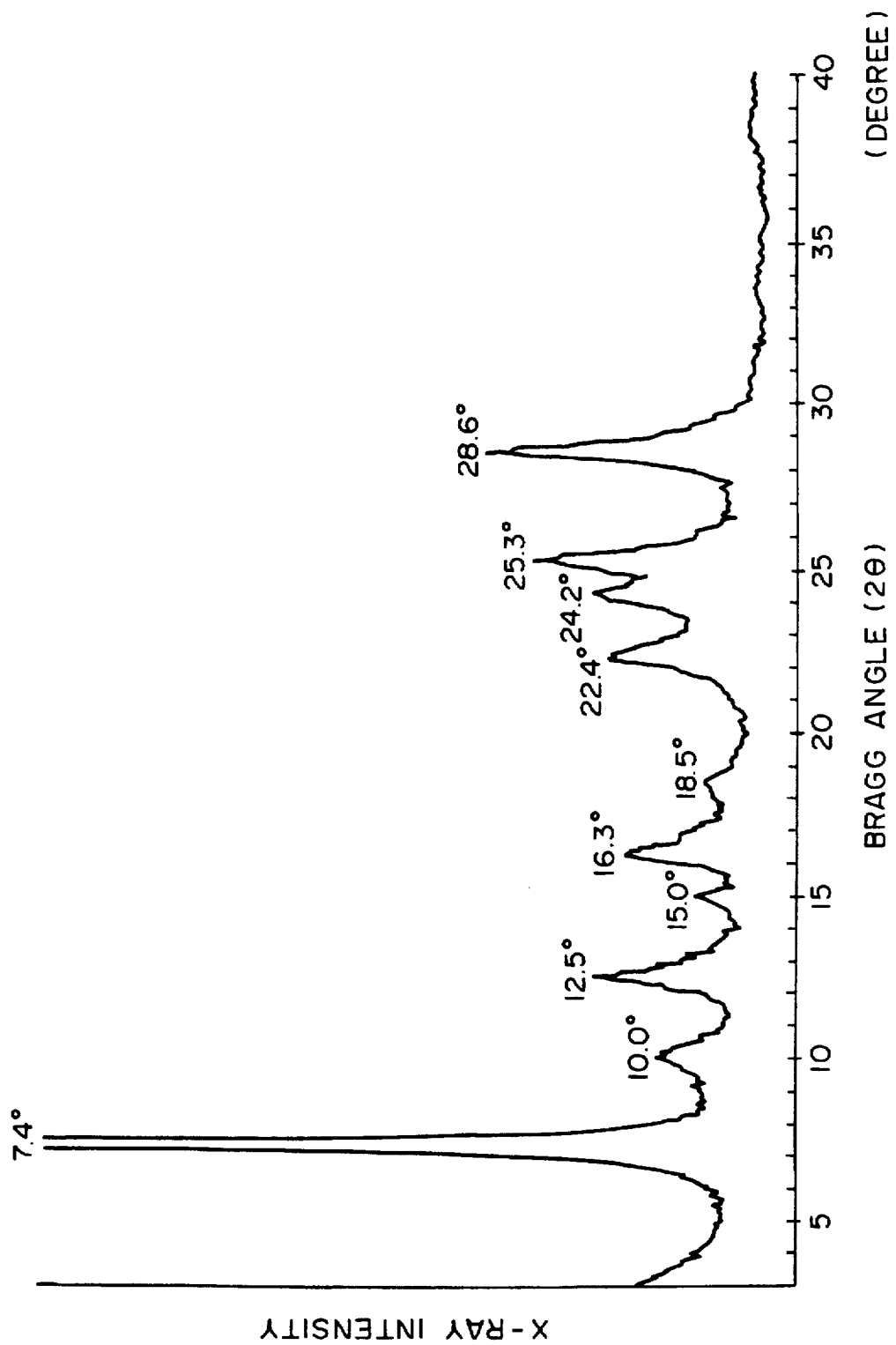

2.0 g of amorphous oxytitanium phthalocyanine prepared in the same manner as in Production Example 1 was added to 50 ml of ethyl cellosolve and subjected to 15 hours of milling at room temperature (20° C.) together with 1 mm-dia. glass beads, followed by the same post-treatment as in Production Example 1 to recover 1.8 g of an oxytitanium phthalocyanine according to the present invention, which provided an X-ray diffraction pattern as shown in FIG. 6.

PRODUCTION EXAMPLE 3

Figure 7:
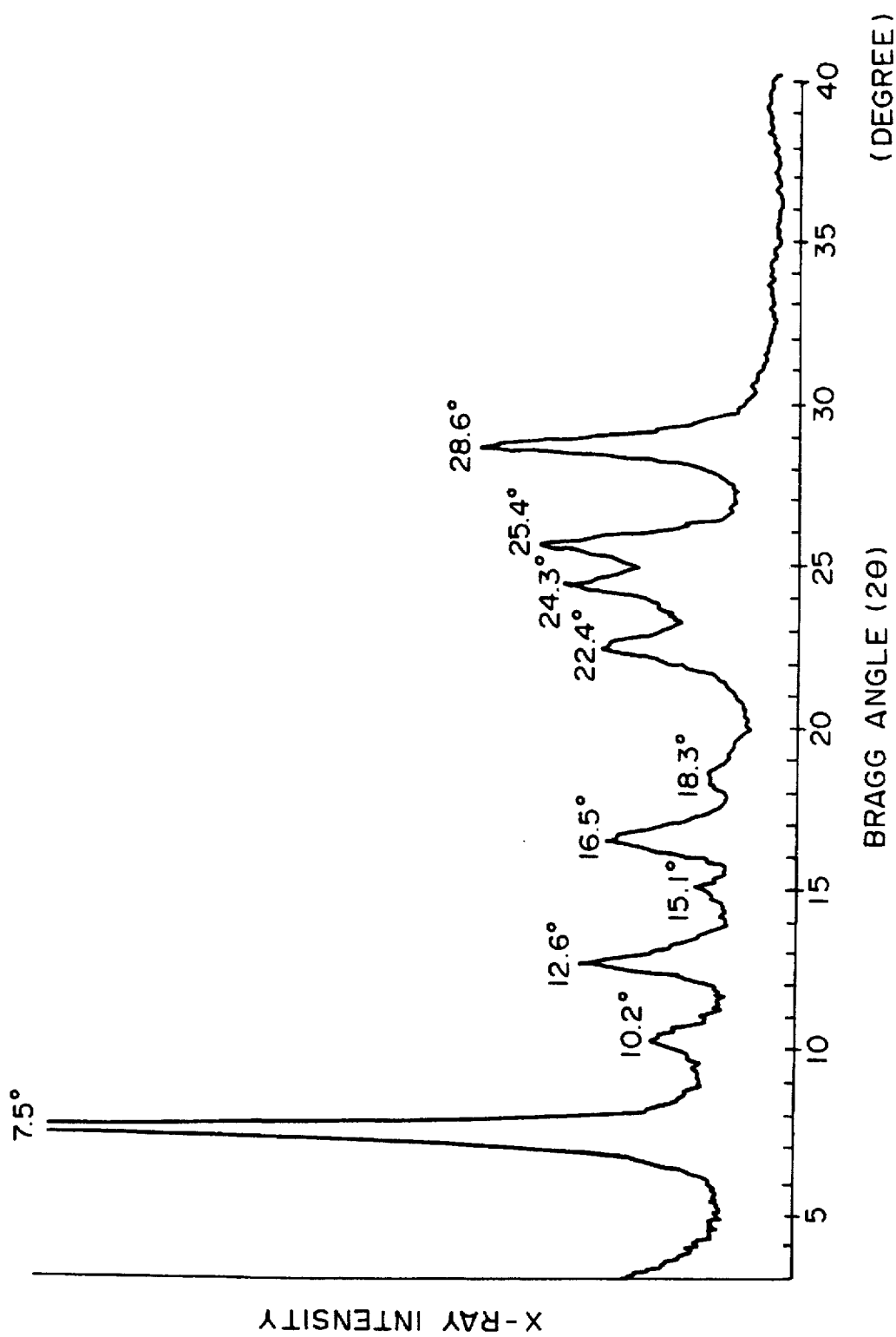

4.0 g of amorphous oxytitanium phthalocyanine prepared in the same manner as in Production Example 1 was added to 100 ml of ethanol and subjected to 1 hour of boiling in the form of suspension under stirring, followed by filtration and drying under a reduced pressure to recover 3.6 g of oxytitanium phthalocyanine crystal, which provided an X-ray diffraction pattern shown in FIG. 7.

COMPARATIVE PRODUCTION EXAMPLE 1

Figure 8:
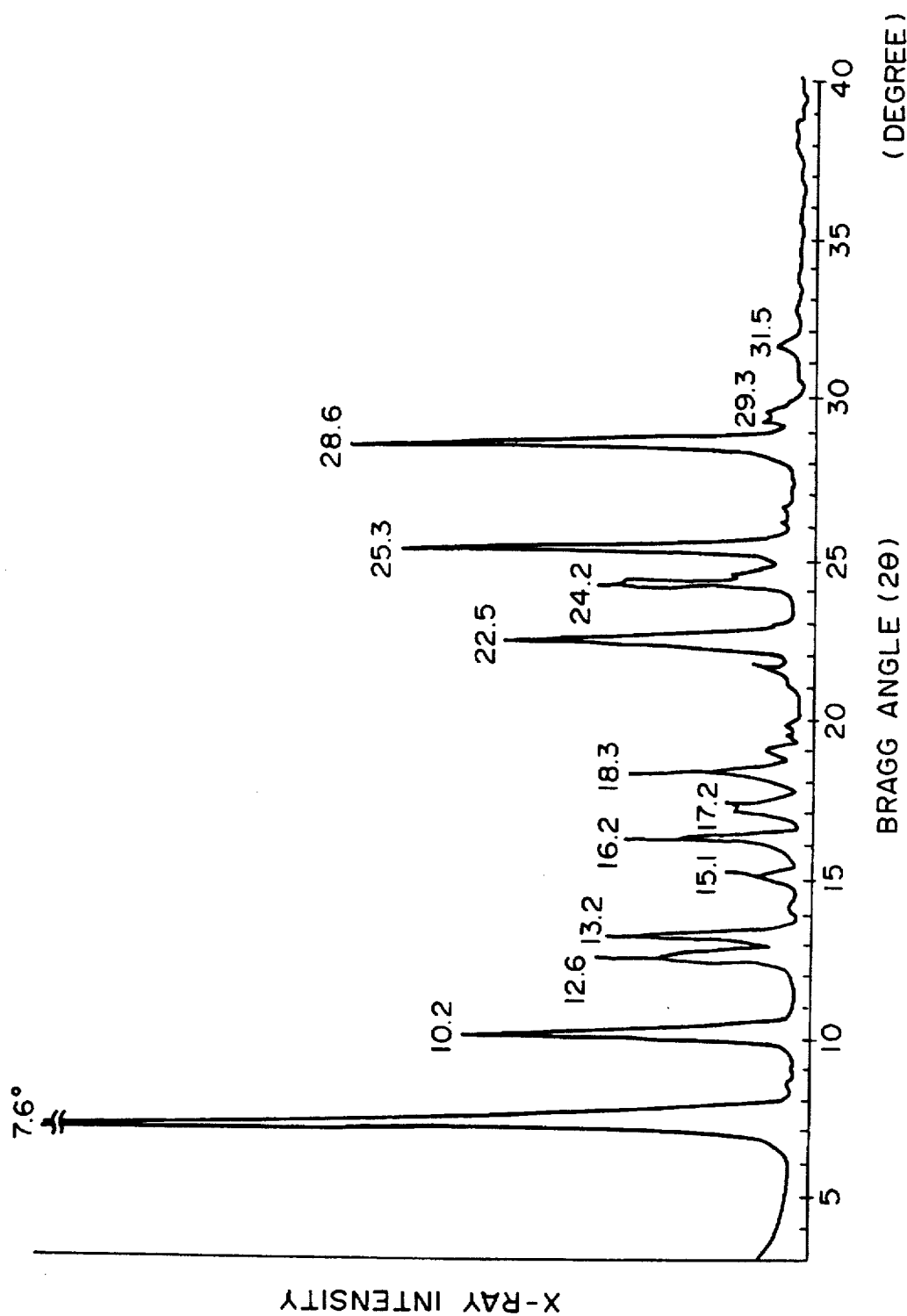
FIGS. 8 and 9 show CuK$\alpha$ X-ray diffraction patterns of oxytitanium phthalocyanines obtained in Comparative Production Examples 1 and 2, respectively.

A so-called α-type crystalline form of oxytitanium phthalocyanine was prepared by following Production Example disclosed in U.S. Pat. No. 4,728,592. The oxytitanium phthalocyanine provided an X-ray diffraction pattern shown in FIG. 8.

COMPARATIVE PRODUCTION EXAMPLE 2

Figure 9:
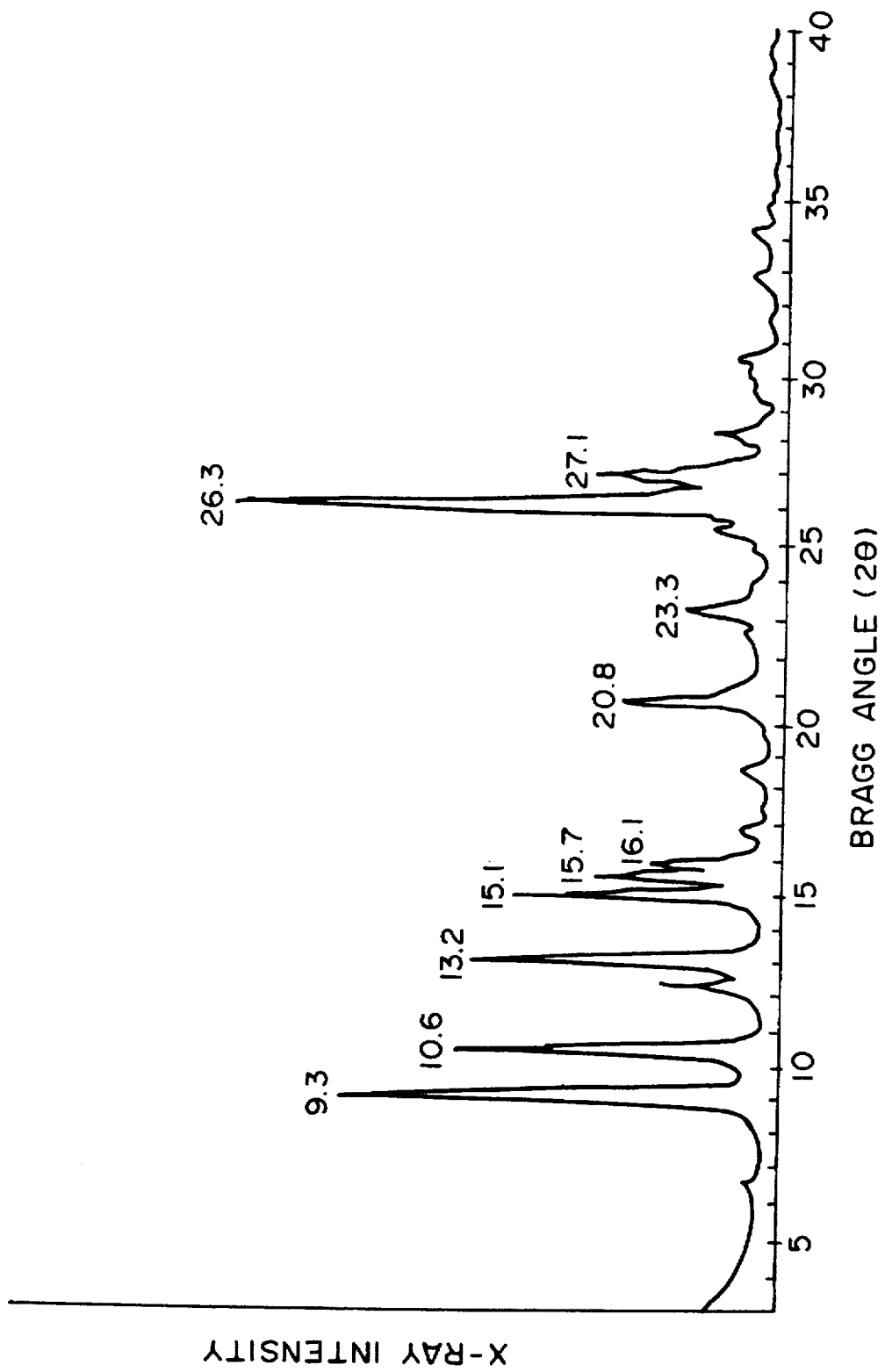

A so-called A-type crystalline form of oxytitanium phthalocyanine was prepared by following Production Example disclosed in U.S. Pat. No. 4,664,997. The oxytitanium phthalocyanine provided an X-ray diffraction pattern shown in FIG. 9.

The X-ray diffraction patterns referred to herein were based on the X-ray diffraction analysis using CuKα characteristic X-rays performed under the following conditions:

Apparatus: X-ray diffraction apparatus "RAD-A system" manufactured by Rigaku Denki K.K.

X-ray tube (Target): Cu

Tube voltage: 50 KV

Tube current: 40 mA

Scanning method: 2θ/θ scan

Scanning speed: 2 deg./min.

Sampling width: 0.020 deg.

Starting angle (2θ): 3 deg.

Stopping angle (2θ): 40 deg.

Divergence slit: 0.5 deg.

Scattering slit: 0.5 deg.

Receiving slit: 0.3 mm

Curved monochromator: used.

Hereinbelow, examples of application of oxytitanium phthalocyanine crystals of the invention to electrophotographic photosensitive members will be explained more specifically. Herein, a term "part(s)" denotes "weight part(s)".

EXAMPLE 1

50 parts of titanium oxide powder coated with tin oxide containing 10% antimony oxide, 25 parts of resol-type phenolic resin, 20 parts of methyl cellosolve, 5 parts of methanol and 0.002 part of silicone oil (polydimethylsiloxane-polyoxyalkylene copolymer, Mw (weight-average molecular weight)=3,000) were dispersed for 2 hours with 1 mm dia.-glass beads by means of a sand mill to prepare a paint for forming an electroconductive layer.

An aluminum cylinder (30 mm dia.×260 mm) was dipped in the above paint, followed by drying for 30 minutes at 140° C. to form a 20 micron-thick electroconductive layer. A solution of 5 parts of a polyamide (6-66-610-12 quaternary copolymer nylon) in a mixture solvent of 70 parts of methanol and 25 parts of butanol was applied onto the electroconductive layer by dipping, followed by drying to provide a 1 micron-thick primer layer.

4 parts of the oxytitanium phthalocyanine crystal prepared in Production Example 1 and 2 parts of polyvinyl butyral (Mw=100,000–150,000) were dissolved in 100 ml of cyclohexanone, followed by dispersion of 1 hour with 1 mm dia.-glass beads by means of a sand mill. The resultant dispersion was diluted with 100 parts of methyl ethyl ketone to prepare a coating liquid. The coating liquid was applied onto the primary layer, followed by drying for 10 minutes at 80° C. to form a 0.15 micron-thick charge generation layer.

Then, a solution was prepared by dissolving 10 parts of the charge-transporting material of the formula:

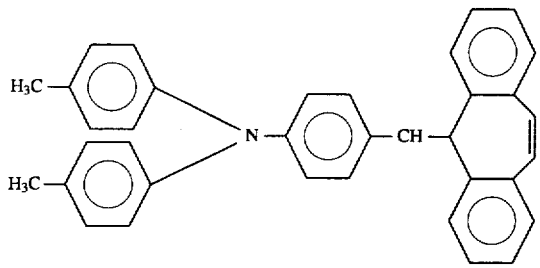

and 10 parts of a bisphenol Z-type polycarbonate resin (Mw=20,000) in 60 parts of monochlorobenzene and then applied onto the charge generation layer by dipping, followed by drying for 1 hour at 110° C. to form a 20 micron-thick charge transport layer, whereby an electrophotographic photosensitive member was prepared.

COMPARATIVE EXAMPLE 1

An electrophotographic photosensitive member was prepared in the same manner as in Example 1 except that the α-type oxytitanium phthalocyanine crystal prepared in Comparative Production Example 1 was used.

COMPARATIVE EXAMPLE 2

An electrophotographic photosensitive member was prepared in the same manner as in Example 1 except that the A-type oxytitanium phthalocyanine crystal prepared in Comparative Production Example 2 was used.

COMPARATIVE EXAMPLE 3

The above-prepared three electrophotographic photosensitive members prepared in Example 1 and Comparative Examples 1–2 were attached to laser beam printers (LBP-SX, manufactured by Canon K.K.), respectively, Each electrophotographic photosensitive member was charged so as to provide a dark-part potential of −700 volts and then exposed to laser light (emission wavelength: 802 nm) to provide an exposed- or light-part potential of −150 volts. The exposure quantity (μJ/cm$^2$) required for decreasing the potential from −700 V to −150 V was measured to evaluate the photosensitivity. The results are shown in Table 1.

TABLE 1

| Photosensitive member (Example) | Exposure quantity (μJ/cm$^2$) |
| --- | --- |
| Example 1 | 0.52 |
| Comparative Example 1 | 0.70 |
| Comparative Example 2 | 0.72 |

Further, the oxytitanium phthalocyanine crystals prepared in Production Examples 2 and 3 were used for providing electrophotographic photosensitive members in the same manner as in Example 1. The exposure quantity was measured in the same manner as described above by using each of the electrophotographic photosensitive members, so that a high electrophotosensitivity similar to that in Example 1 was obtained in each case.

The above-mentioned three electrophotographic photosensitive members prepared in Example 1 and Comparative Examples 1–2 were subjected to a copying test (durability test) of 4000 sheets on condition that the initial dark-part potential and light-part potential were set to −700 V and −150 V, respectively. The dark-part potential and light-part potential were measured to evaluate electrophotographic photosensitive characteristics, and states of images were observed. Changes in the dark-part potential and potential contrast (i.e., the difference between the dark-part potential and light-part potential) are shown in FIGS. 10 and 11, respectively.

Figure 10:
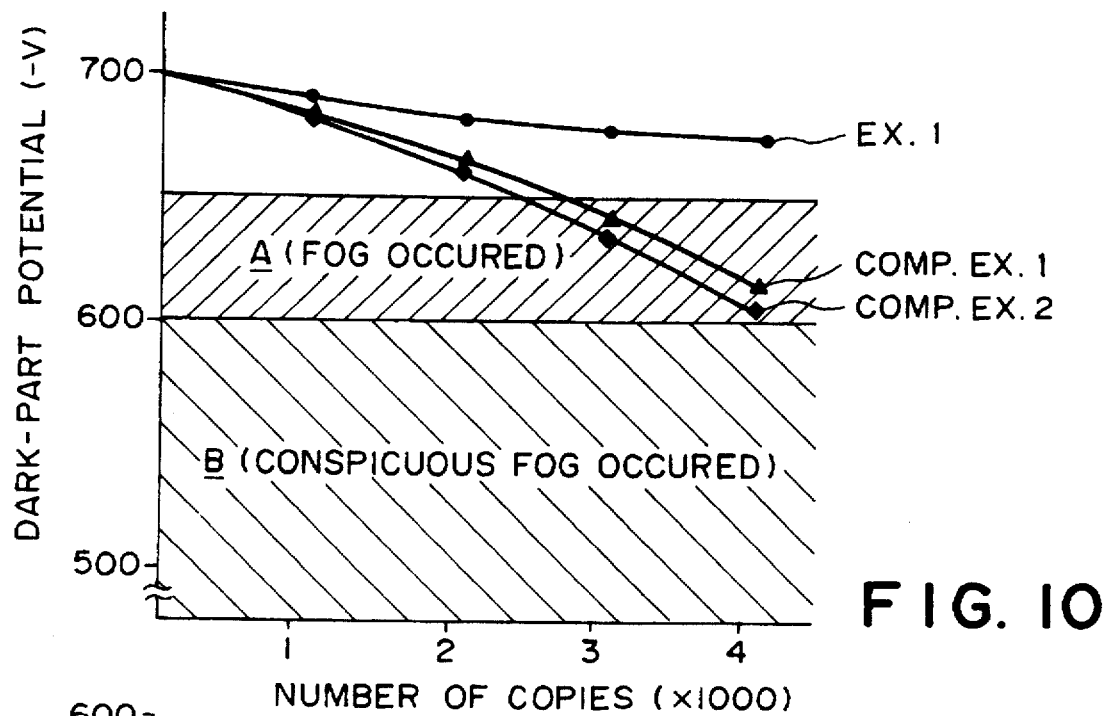
FIG. 10 is a graph showing a change in dark-part potential during a successive copying test of photosensitive members obtained in Example 1 and Comparative Examples 1 and 2.
Figure 11:
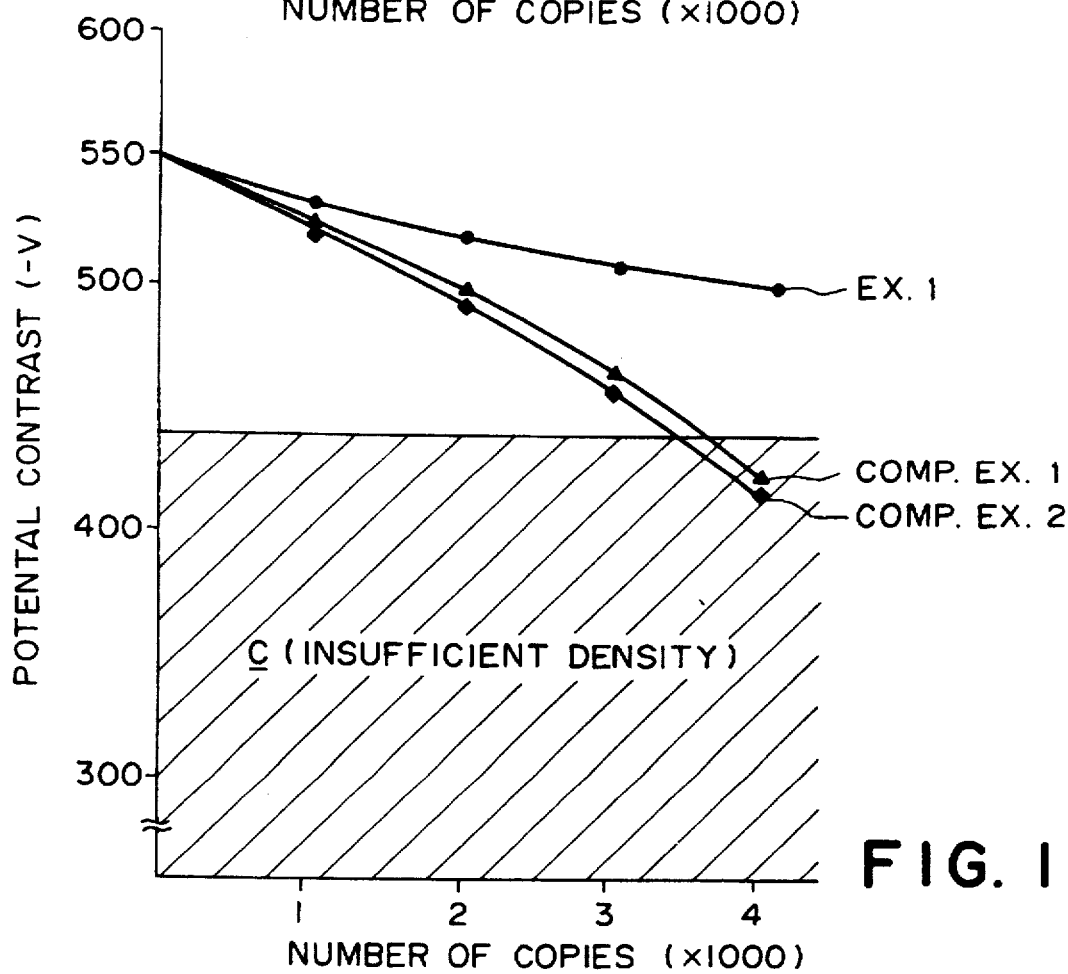
FIG. 11 is a graph showing a change in potential contrast between the dark-part potential and light-part potential of photosensitive members obtained in Example 1 and Comparative Examples 1 and 2.

As is apparent from FIGS. 10 and 11, the photographic photosensitive member of Example 1 provided good images similar to the initial image in the durability test. On the other hand, the photosensitive members of Comparative Examples 1–2 provided images each having fog on the white background (the hatched region A in FIG. 14). Further, in order to prevent fog from the white background, the density was controlled by means of a density control lever when the photosensitive members of Comparative Examples 1 and 2 were used, whereby the density of a black portion became insufficient as shown in FIG. 11 (the hatched region C).

Separately, there were provided three photosensitive members prepared in the same manner as in Example 1 and Comparative Examples 1 and 2. A part of each photosensitive member was irradiated with white light (1500 lux) for 30 minutes. Each photosensitive member was attached to the above-mentioned laser beam printer and charged in dark with respect to both the irradiated and non-irradiated parts in such an intensity as to provide a dark-part potential of −700 V at the non-irradiated part. Then, the surface potential of the irradiated part was measured to evaluate the charging characteristic. The results are shown in Table 2.

TABLE 2

| Photosensitive member (Example) | Non-irradiated part (V) | Irradiated part (V) | Difference (V) |
| --- | --- | --- | --- |
| Example 1 | −700 | −650 | 50 |
| Comparative Example 1 | −700 | −625 | 75 |
| Comparative Example 2 | −700 | −625 | 75 |

Further, the oxytitanium phthalocyanine crystals prepared in Production Examples 2 and 3 were used for providing electrophotographic photosensitive members in the same manner as in Example 1. The photosensitive members were subjected to the above measurement to provide a good photomemory characteristic (a charging characteristic after light irradiation) similar to that in Example 1.

Figure 12:
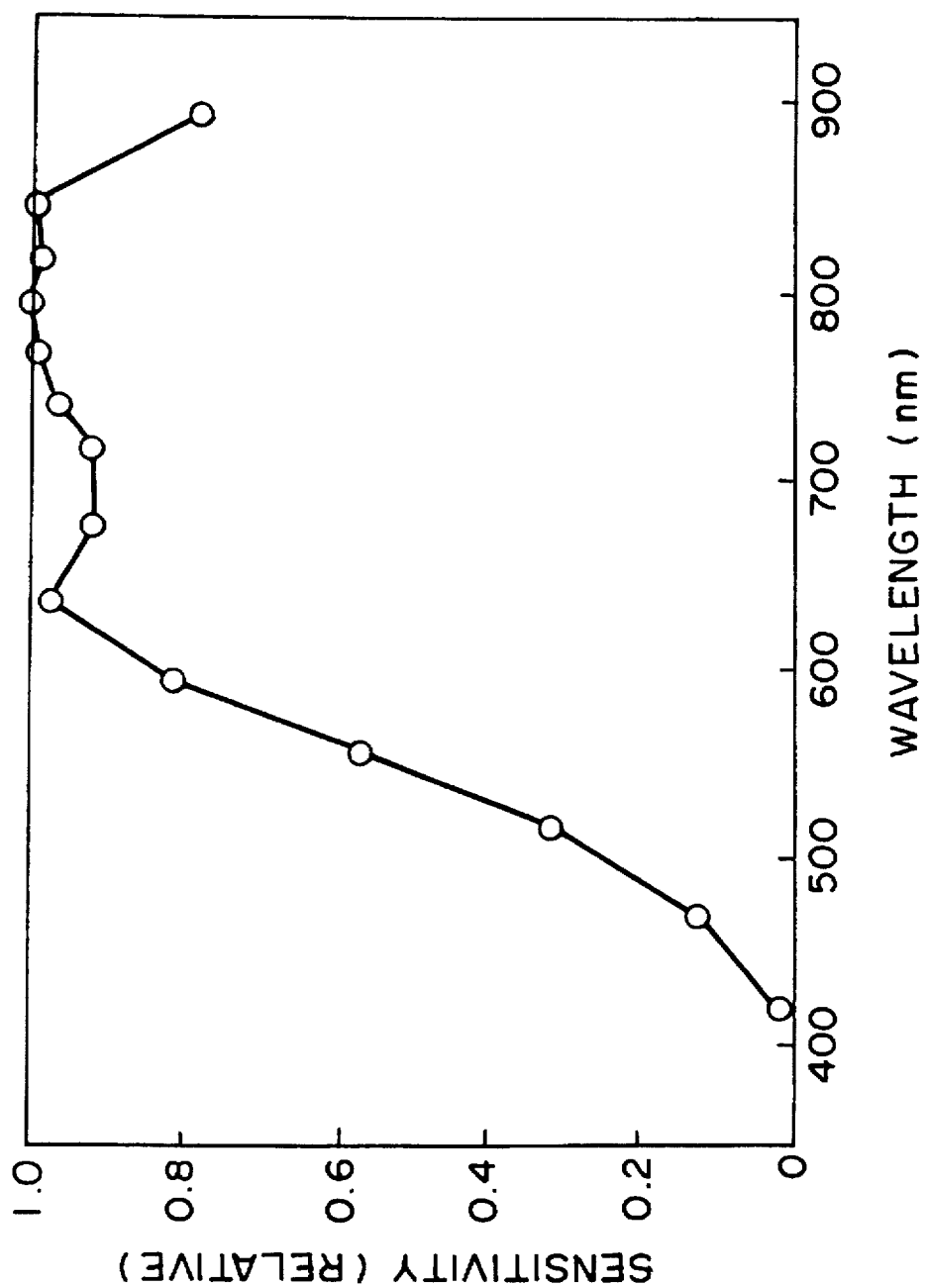
FIG. 12 is a graph showing a relative spectral sensitivity of a photosensitive member obtained in Example 1.

Incidentally, FIG. 12 shows a spectral sensitivity distribution of the photosensitive member of Example 1 in relative values with respect to a maximum spectral sensitivity indicated as 1.0. As shown in FIG. 12, the photosensitive member according to the present invention using the oxytitanium phthalocyanine having a characteristic crystal form shows a stably high sensitivity in a longwavelength region around 750–850 nm.

The coating liquid for providing the charge generation layer in Example 1 containing the oxytitanium phthalocyanine crystal of the invention was left standing for one month. The oxytitanium phthalocyanine crystal was recovered from the resultant coating liquid and was subjected to X-ray diffraction analysis, whereby the X-ray diffraction pattern caused no change and it was found that the original crystal form was retained. Accordingly, the oxytitanium phthalocyanine crystal of the invention showed an excellent stability when stored in a liquid form.

It was also confirmed that the oxytitanium phthalocyanine according to the present invention showed clear peaks of Bragg angles (2θ±0.2 degree) of 7.4 degrees, 10.2 degrees, 12.5 degrees, 15.0 degrees, 16.3 degrees, 18.3 degrees, 22.4 degrees, 24.2 degrees, 25.2 degrees and 28.5 degrees by CuKα X-ray analysis even after it was applied onto the aluminum support.

EXAMPLE 2

A photosensitive member was prepared in the same manner as in Example 1 except that a bisphenol Z-type polycarbonate resin (Mw=20,000) was used as a binder resin of a charge generation layer.

EXAMPLE 3

A photosensitive member was prepared in the same manner as in Example 1 except that a compound represented by the following formula:

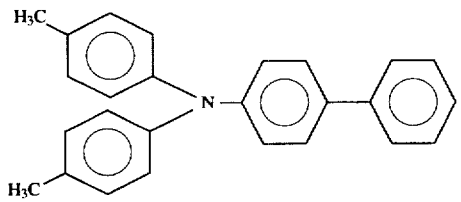

was used as a charge-transporting material.

EXAMPLE 4

A photosensitive member was prepared in the same manner as in Example 1 except that a compound represented by the following formula:

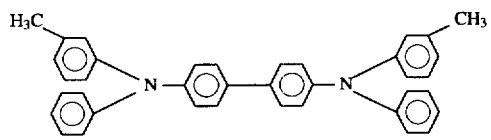

was used as a charge-transporting material.

The above-prepared three photosensitive members prepared in Examples 2–4 were subjected to measurement of exposure quantity required for changing the surface potential from an initial value of −700 V to −150 V in the same manner as in Example 1 to evaluate the photosensitivity. The results are shown in Table 3 below.

TABLE 3

| Photosensitive member | Exposure quantity ($\mu J/cm^2$) |
|---|---|
| Example 2 | 0.52 |
| Example 3 | 0.53 |
| Example 4 | 0.52 |

EXAMPLE 5

On a 50 micron-thick aluminum sheet substrate, a primer layer similar to the one in Example 1 was formed by means of a bar coater, and a 20 micron-thick charge transport layer similar to the one in Example 1 was further formed thereon. Separately, 3 parts of the oxytitanium phthalocyanine crystal prepared in Production Example 1 was mixed with a solution of 5 parts of a bisphenol Z-type polycarbonate resin (Mw=20,000) in 68 parts of cyclohexane and were dispersed for 1 hour by means of a sand mill. To the resultant dispersing liquid, 5 parts of a bisphenol Z-type polycarbonate resin (Mw=20,000) and 10 parts of the charge-transporting material used in Example 1, followed by dilution with 40 parts of tetrahydrofuran and 40 parts of dichloromethane to provide a dispersion paint. The paint was applied onto the above-prepared charge transport layer by spray coating, followed by drying the resultant coating to form a 6 micron-thick charge generation layer, whereby a photosensitive member was prepared.

COMPARATIVE EXAMPLE 4

A photosensitive member was prepared in the same manner as in Example 5 except that α-type oxytitanium phthalocyanine crystal prepared in Comparative Production Example 1 was used.

COMPARATIVE EXAMPLE 5

A photosensitive member was prepared in the same manner as in Example 5 except that the A-type oxytitanium phthalocyanine crystal prepared in Comparative Production Example 2 was used.

The above-prepared three photosensitive members prepared in Example 5 and Comparative Examples 3 and 4 were subjected to evaluation of photosensitivity by means of an electrostatic testing apparatus (EPA-8100, manufactured by Kawaguchi Denki K.K.). Each photographic photosensitive member was charged so as to provide 700 V (positive) of surface potential by corona charging and was exposed to monochromatic light (emission wavelength: 802 nm) isolated by means of a monochromator to provide 200 V (positive) of surface potential. The exposure quantity ($\mu J/cm^2$) required for decreasing the potential from 700 V to 200 V was measured to provide the results shown in Table 4 below.

TABLE 4

| Photosensitive member | Exposure quantity ($\mu J/cm^2$) |
|---|---|
| Example 5 | 0.69 |
| Comparative Example 3 | 0.99 |
| Comparative Example 4 | 1.05 |

As described above, the oxytitanium phthalocyanine according to the present invention has a novel crystalline form and in useful as a charge generation material providing an electrophotographic photosensitive member, which shows a very high sensitivity to longwavelength light, is excellent in potential stability without causing a potential charge as by a decrease in chargeability in a continuous use, and also shows a good photomemory characteristic against white light.

What is claimed is:

1. Oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays.

2. A process for producing oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays; said process comprising:

selecting at least one solvent selected from the group consisting of monohydric alcohols having at least two carbon atoms, cellosolves, diethylene glycol monoethers and diacetone alcohol; and treating amorphous oxytitanium phthalocyanine with said selected solvent.

3. A process according to claim 2, wherein said amorphous oxytitanium phthalocyanine is obtained by treating crystalline oxytitanium phthalocyanine by acid pasting.

4. A process according to claim 2, wherein said monohydric alcohols having at least two carbon atoms are selected from the group consisting of ethanol, i-propyl alcohol, n-propyl alcohol, n-butyl alcohol, t-amyl alcohol, and n-octyl alcohol.

5. A process according to claim 2, wherein said cellosolves are selected from the group consisting of methyl cellosolve, ethyl cellosolve, n-butyl cellosolve, n-butyl cellosolve, ethylene glycol mono t-butyl ether, and 1-methoxy-2-propyl alcohol.

6. A process according to claim 2, wherein said diethylene glycol monoethers are selected from the group consisting of methyl carbitol, ethyl carbitol, and diethylene glycol mono-n-butyl ether.

7. A process according to claim 2, wherein the amorphous oxytitanium phthalocyanine is treated by dispersion in the presence of the solvent.

8. A process according to claim 7, wherein the amorphous oxytitanium phthalocyanine is dispersed by milling in the presence of the solvent.

9. A process according to claim 2, wherein the amorphous oxytitanium phthalocyanine is treated by suspension in the solvent under stirring.

10. An electrophotographic photosensitive member, comprising an electroconductive support and a photosensitive layer disposed thereon, said photosensitive layer containing oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays.

11. A photosensitive member according to claim 10, wherein said photosensitive layer is formed in a single layer.

12. A photosensitive member according to claim 10, wherein said photosensitive layer includes a charge generation layer and a charge transport layer.

13. A photosensitive member according to claim 12, which comprises the electroconductive support, the charge generation layer and the charge transport layer in this order.

14. A photosensitive member according to claim 12, which comprises the electroconductive support, the charge transport layer and the charge generation layer in this order.

15. A photosensitive member according to claim 10, wherein an undercoat layer is disposed between the electroconductive support and the photosensitive layer.

16. A photosensitive member according to claim 10, wherein a protective layer is disposed on the photosensitive layer.

17. An electrophotographic apparatus, comprising: an electrophotographic photosensitive member, means for forming an electrostatic latent image, means for developing the electrostatic latent image, and means for transferring the developed image to a transfer-receiving material;

said electrophotographic photosensitive member comprising an electroconductive support and a photosensitive layer disposed thereon, said photosensitive layer containing oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays.

18. A device unit, comprising an electrophotographic photosensitive member, charging means and cleaning means supported integrally to form the device unit which is attachable to and releasable from an apparatus body; said electrophotographic photosensitive member comprising an electroconductive support and a photosensitive layer disposed thereon, said photosensitive layer containing oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays.

19. A device unit according to claim 18, further including developing means.

20. A facsimile machine, comprising an electrophotographic apparatus and means for receiving image data from a remote terminal;

said electrophotographic apparatus including an electrophotographic photosensitive member;

said electrophotographic photosensitive member comprising an electroconductive support and a photosensitive layer disposed thereon, said photosensitive layer containing oxytitanium phthalocyanine having a crystal form characterized by main peaks specified by Bragg angles (2θ±0.2 degrees) of only 7.4 degrees, 10.2 degrees, 12.5 degrees, 15.0 degrees, 16.3 degrees, 18.3 degrees, 22.4 degrees, 24.2 degrees, 25.2 degrees and 28.5 degrees in X-ray diffraction pattern based on CuKα characteristic X-rays.

21. The invention of claims 1, 2, 10, 17, 18 or 20, wherein said oxytitanium phthalocyanine has substantially no peaks other than said main peaks.

* * * * *

UNITED STATES PATENT AND TRADEMARK OFFICE
CERTIFICATE OF CORRECTION

PATENT NO. : 5,593,805

DATED : January 14, 1997

INVENTOR(S): SHINTETSU GO ET AL.

It is certified that error appears in the above-identified patent and that said Letters Patent is hereby corrected as shown below:

DRAWING SHEET 9

FIG. 10, "OCCURED)" (both occurrences) should read --OCCURRED)--.

TITLE PAGE
[56] REFERENCES CITED

Foreign Patent Documents, "59,166959 9/1959 Japan" should read --59-166959 9/1984 Japan--.

COLUMN 1

Line 56, "JP-A, 63, 198067" should read -JP-A 63-198067--.

COLUMN 13

Line 3, "in" should read --is--.

UNITED STATES PATENT AND TRADEMARK OFFICE
CERTIFICATE OF CORRECTION

PATENT NO. : 5,593,805

DATED : January 14, 1997

INVENTOR(S) : SHINTETSU GO ET AL.

It is certified that error appears in the above-identified patent and that said Letters Patent is hereby corrected as shown below:

COLUMN 13

Lines 41-42, "n-butyl cellosolve," (second occurrence) should be deleted.

Signed and Sealed this

Eighth Day of July, 1997

Attest:

BRUCE LEHMAN

Attesting Officer       Commissioner of Patents and Trademarks